United States Patent [19]
Reichnebacher

[11] 3,839,716
[45] Oct. 1, 1974

[54] SIGNAL PROCESSING APPARATUS

[75] Inventor: George Reichnebacher, Stony Brook, N.Y.

[73] Assignee: North Atlantic Industries, Inc., Plainview, N.Y.

[22] Filed: Mar. 23, 1973

[21] Appl. No.: 344,112

[52] U.S. Cl. ..................... 340/347 SY, 340/347 NT
[51] Int. Cl. .......................................... H03k 13/20
[58] Field of Search. 340/347 SY, 347 NT, 347 AD

[56] References Cited

UNITED STATES PATENTS

| | | | |
|---|---|---|---|
| 3,277,461 | 4/1966 | Selvin | 340/347 SY |
| 3,295,125 | 12/1966 | Idelsohn et al. | 340/347 SY |
| 3,316,547 | 4/1967 | Ammann | 340/347 NT |
| 3,504,361 | 3/1970 | Catton | 340/347 SY |
| 3,510,867 | 5/1970 | Sliwa | 340/347 SY |
| 3,516,084 | 6/1970 | Sacks et al. | 340/347 SY |
| 3,618,073 | 11/1971 | Domchick et al. | 340/347 SY |
| 3,710,374 | 1/1973 | Kelly | 340/347 NT |
| 3,713,141 | 1/1973 | Higgins et al. | 340/347 SY |

OTHER PUBLICATIONS

Crider et al. "IBM Technical Disclosure Bulletin" Vol. 12 No. 10, March, 1970, pg. 1,602

*Primary Examiner*—Charles D. Miller
*Attorney, Agent, or Firm*—Morgan, Finnegan, Durham & Pine

[57] ABSTRACT

Disclosed herein are methods and apparatus for analyzing signals containing phase information and for deriving therefrom digital representations of that phase information. The phase information may be present in resolver-type signals or may be contained in AC signals having a phase relative to a reference. In both cases the phase sensitive information is converted to DC signals proportional to $\sin\theta$ and $\cos\theta$. In one embodiment a signal proportional to $\sin\theta/\theta$ is synthesized from the signals proportional to $\sin\theta$ and $\cos\theta$. A signal proportional to $\sin\theta$ is then integrated for a time $t_1$ after which a negative signal proportional to $\sin\theta/\theta$ is integrated for a time $t_2$ until the integrator output returns to its original state. Counting during $t_2$ results in a count directly proportional to $\theta$. In another embodiment a signal proportional to $\sin\theta$ is integrated during $t_1$ and a negative signal proportional to $\cos\theta$ is integrated during $t_2$. This results in a count directly proportional to $\tan\theta$. A look-up table then provides the conversion from $\tan\theta$ to $\theta$.

18 Claims, 6 Drawing Figures

SIGNAL PROCESSING APPARATUS

BACKGROUND AND BRIEF DESCRIPTION OF THE INVENTION

The invention disclosed herein relates to techniques and apparatus for analyzing signals containing phase information and for deriving therefrom digital representations of that information.

Phase information is embodied in signals of various types. For example, phase information is contained in resolver-type signals of the form $E_s \sin\theta$ sinwt and $E_s \cos\theta$ sinwt. Phase information is also present in AC electrical signals of the form $E_s \sin(wt+\theta)$, where $\theta$ is the phase relative to a reference. It is often desirable to derive a digital representation of $\theta$ from both types of signals, either for display or for subsequent processing. The instant invention teaches various ways in which this may be accomplished.

In one embodiment of the invention an AC signal of the form $E_s \sin(wt+\theta)$ is analyzed to derive therefrom DC voltages proportional to the quadrature and in-phase components, i.e., $\sin\theta$ and $\cos\theta$. A signal proportional to $\sin\theta/\theta$ is then synthesized from the signals proportional to $\sin\theta$ and $\cos\theta$. A signal proportional to $\sin\theta$ is integrated for a time $t_1$ following which a negative signal proportional to $\sin\theta/\theta$ is integrated for a time $t_2$ until the integrator output returns to its original state. Counting during $t_2$ results in a count directly proportional to $\theta$, i.e., $\theta = t_2/t_1$.

The technique for integrating one signal in one direction after which a second signal is integrated in the opposite direction is sometimes referred to as "dual slope" integration. Various techniques for carrying out dual slope integration are set forth in U.S. Pat. Nos. 3,051,939 and 3,316,547.

In a second embodiment of the invention a signal proportional to $\sin\theta$ is integrated for a time $t_1$ after which a negative signal proportional to $\cos\theta$ is integrated for a time $t_2$ until the integrator output returns to its original state. Counting during $t_2$ results in a count directly proportional to $\tan\theta$, i.e., $\tan\theta = t_2/t_1$. A look-up table or other suitable means is used to provide a digital representation of $\theta$ in accordance with the equation $\theta = \tan^{-1} t_2/t_1$.

Other objectives and advantages of the invention will be set forth in part hereafter and in part will be obvious herefrom or may be learned by practice with the invention, the same being realized and attained by means of the instrumentalities, combinations and improvements herein shown, described and claimed.

BRIEF DESCRIPTION OF THE DRAWINGS

Serving to illustrate exemplary embodiments of the invention are the drawings, of which.

DETAILED DESCRIPTION

Figure 1:
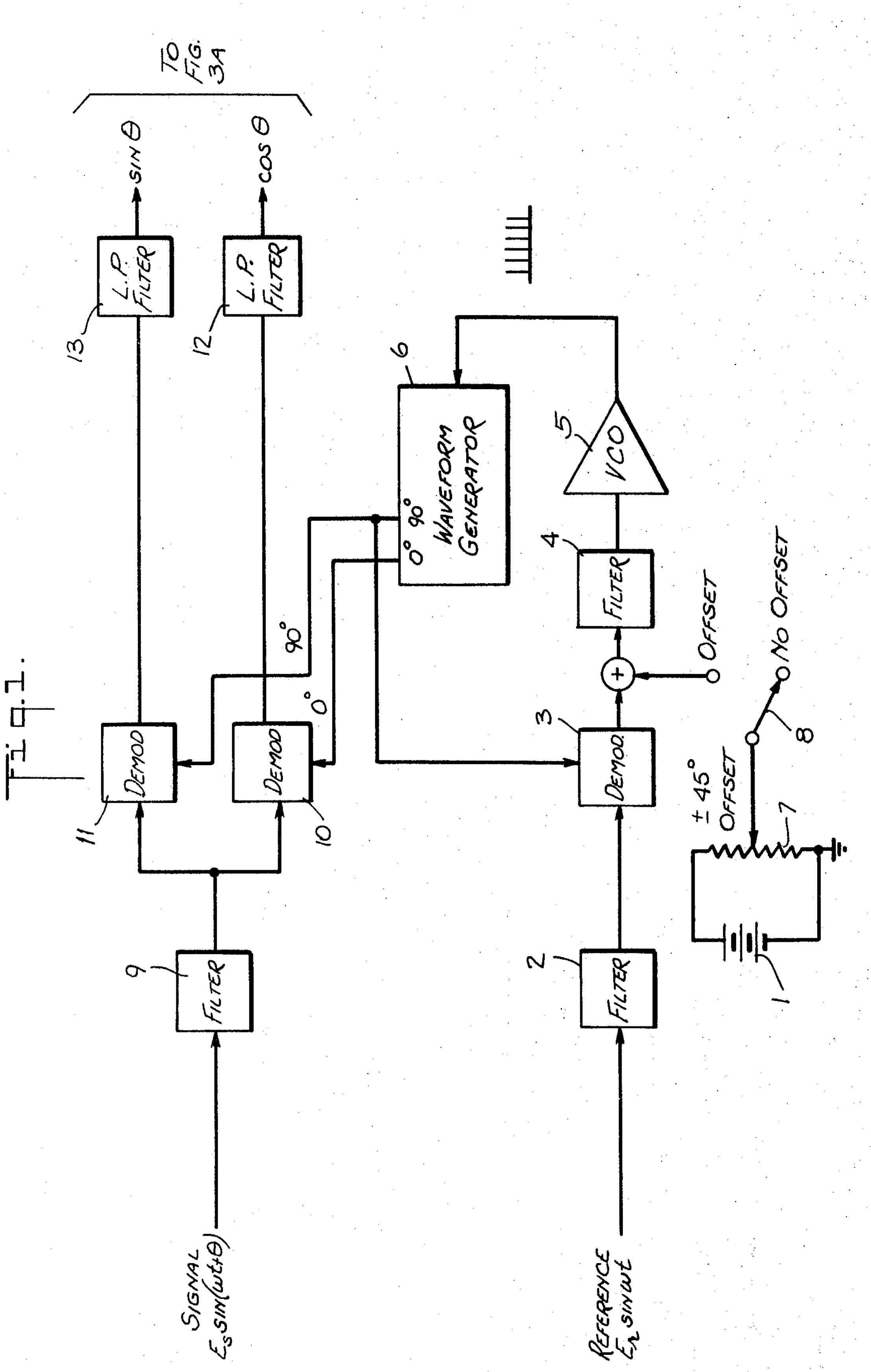
FIG. 1 is a schematic diagram illustrating one manner in which in-phase and quadrature components may be derived.

The invention will now be described in detail with reference to the drawings forming a part of this specification. In one embodiment of the invention the phase angle of an AC signal of the form $E_s \sin(wt+\theta)$ is measured and digitized. This AC signal may be viewed as being composed of the fundamental component plus all higher harmonics plus noise. FIG. 1 is a schematic diagram illustrating the manner in which the in-phase and quadrature components of the fundamental are derived.

As shown in FIG. 1, a reference signal $E_r \sin$ wt is applied to input filter 2, which is a two-pole low-pass filter. In the preferred embodiment, the reference signal has a constant amplitude which is achieved using conventional automatic gain control techniques. The output of filter 2 comprises the fundamental $E_r \sin$ wt and may also contain some higher order harmonics and noise. This output signal is fed to a phase locked loop comprising demodulator 3, filter 4, VCO 5 and waveform generator 6. Demodulator 3 is a full-wave phase sensitive demodulator or multiplier of conventional design. Filter 4 is an active low pass filter and integrator which compensates the phase locked loop. VCO 5 is a narrow band, e.g., ± 7%, voltage controlled oscillator which may utilize unijunction transistors. The output frequency of VCO 5 is 12 times the input frequency. Waveform generator 6 comprises a counter and logic to generate two "chopping" waveforms which have 0° and 90° phase shift with respect to the reference signal. The 90° chopping waveform is used to drive demodulator 3 which closes the phase locked loop. Demodulator 3 produces zero DC output when the phase locked loop is locked onto the reference signal.

In some applications it is advantageous to be able to phase shift the reference in a controlled manner. This is implemented by voltage source 1, potentiometer 7 and switch 8. With switch 8 in the "OFFSET" position, a variable offset DC signal is summed with the output of demodulator 3. The closed loop action is such as to maintain zero error signal into filter 4. It will do this by phase shifting the chopping signal with respect to the reference. The circuit shown in FIG. 1 allows for a ± 45° phase shift.

Figure 2:
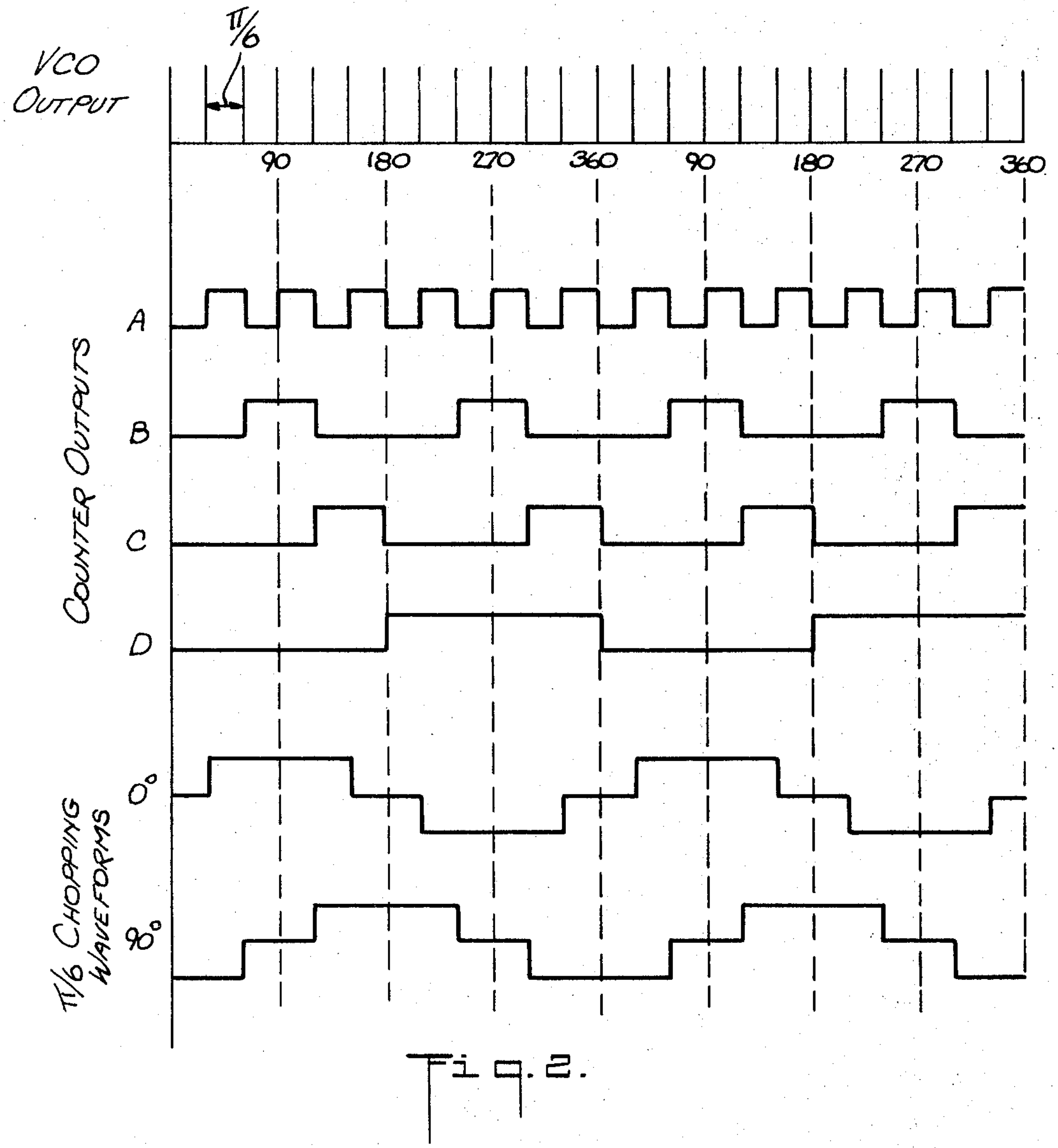
FIG. 2 is a timing diagram.

FIG. 2 is a timing diagram for waveform generator 6. As previously noted, the VCO output is a train of pulses at 12 times the frequency of the reference signal. This output signal is counted down by a divide-by-12 counter contained in waveform generator 6. The counter outputs, shown as A, B, C and D in FIG. 2, are combined to develop the "$\pi/6$" chopping waveforms also shown in FIG. 2.

Using a phase locked loop to derive the chopping waveforms has several distinct advantages. In the first place, the orthogonality of the 0° and 90° chopping waveforms is determined digitally instead of using conventional analog phase shifting techniques. This ensures a much greater accuracy over the input bandwidth. Secondly, $\pi/6$ chopping waveforms may be utilized which do not contain third or even order harmonics. Thus, to the extent the reference signal contains even and third harmonics, these will be rejected by demodulator 3. This choice of $\pi/6$ chopping waveforms also means that the input filters may be considerably simpler than would otherwise be necessary and the problem of matching the phase shift and phase shift gradient with frequency of the input filters is minimized.

The signal whose phase is sought to be measured, i.e., $E_s\sin(wt+\theta)$, is applied to input filter 9, which is a two-pole low-pass filter having substantially the same phase shift as input filter 2. The output of filter 9 is applied to phase sensitive demodulators 10 and 11 which are driven by the 0° and 90° outputs from waveform generator 6. The outputs from demodulators 10 and 11 are fed to low pass filters 12 and 13 respectively, which are three-pole Bessel active filters which suppress the extraneous AC demodulator outputs. The output of filter 12 is proportional to the in-phase component of the applied signal, i.e., $\cos\theta$, while the output of filter 13 is proportional to the quadrature component, i.e., $\sin\theta$. For purposes of convenience the proportionality factor is not expressed.

Referring to FIG. 3A the manner in which the signals proportional to $\sin\theta$ and $\cos\theta$ are manipulated to derive the phase angle $\theta$ will now be explained. The signal proportional to $\cos\theta$ is fed to absolute value and polarity detector 14, which comprises a non-linear and a linear amplifier. The output of the polarity detector, which is a logic 1 when $\cos\theta$ is positive and logic 0 when $\cos\theta$ is negative, is supplied to input C of decoder logic 15.

The signal proportional to $\sin\theta$ is supplied to absolute value and polarity detector 16, which may also comprise a linear and a non-linear amplifier. The output of polarity detector 16, which is a logic 1 when $\sin\theta$ is positive and a logic 0 when $\sin\theta$ is negative, is supplied to the S input of decoder logic 15. Absolute value and polarity detectors 14 and 16 contain a slight amount of hysteresis to prevent chatter.

Absolute value and polarity detectors 14 and 16 produce, respectively, outputs proportional to the absolute value of $\cos\theta$ and $\sin\theta$. These two signals form the inputs to octant detector 17, which may comprise an operational amplifier containing a slight hysteresis. The output of octant detector 17, which is a logic 1 when $\cos\theta$ is greater than $\sin\theta$ and a logic 0 when $\sin\theta$ is greater than $\cos\theta$, is supplied to the OD input of decoder logic 15.

Octant sensing and switching is employed to simplify the circuitry required by taking advantage of the fact that, within a quadrant, the sine and cosine are complementary functions i.e., $\cos\theta = \sin(90°-\theta)$. By breaking each quadrant up into octants the circuitry required is even further simplified, as will become apparent from the subsequent description of the system.

Decoder logic 15 operates upon the C, S and OD inputs to determine the octant in which $\theta$ resides. Decoder logic 15 then controls switch 18 to effect polarity reversal of the cosine and sine absolute values produced by absolute value and polarity detectors 14 and 16 respectively. In addition, decoder logic 15 both presets and controls the direction of counting of counter/processor 19. For example, if $\theta$ were 10° then switch 18 would be in position A, counter/processor 19 would be preset to 0° and the direction of counting would be up. Similarly, if $\theta$ were 80° switch 18 would be in position B, counter/processor 19 would be present to 90° and the direction of counting would be down. The octant switching, counter preset and direction of counting are set forth for each octant in TABLE 1, infra.

In order to determine the phase angle $\theta$, two trigonometric functions are utilized. In one embodiment they are $\sin\theta$ and $\sin\theta/\theta$ A signal proportional to $\sin\theta$ is readily available from absolute value and polarity detector 16 and is supplied by way of switch 18. The function $\sin\theta/\theta$ must, however, be synthesized. The technique for doing so utilizes piecewise approximations over three segments comprising an octant. Thus, for example, the octant 0°–45° is broken up into the segments 0°–23.3°, 23.3°–35.2° and 35.2°–45°. Segment sensing and switching is effected by segment detectors 20 and 21, the inputs of which are the signals proportional to the absolute values of $\sin\theta$ and $\cos\theta$ supplied by switch 18.

The negative function $\sin\theta/\theta$ is synthesized by summing a portion of the signal proportional to $\sin\theta$ with a portion of the signal proportional to $\cos\theta$. The following empirical equations approximate the function $K\sin\theta/\theta$ over the three segments comprising the octant.

(0° – 23.3°); $K\sin\theta/\theta \approx 0.8528916\cos\theta + 1.1665534\sin\theta$ (23.3° – 35.2°); $K\sin\theta/\theta \approx 0.8007726\cos\theta + 0.286243\sin\theta$ (35.2° – 45°); $K\sin\theta/\theta \approx 0.741107\cos\theta + 0.370758\sin\theta$

TABLE 1

| | OCTANT SWITCHING | | | | | |
|---|---|---|---|---|---|---|
| OCTANT | S | C | OD | SWITCH 18 | COUNTER PRESET | COUNT |
| 1 (0–45) | 1 | 1 | 1 | A | 0 | UP |
| 2 (45–90) | 1 | 1 | 0 | B | 90 | DOWN |
| 3 (90–135) | 1 | 0 | 0 | B | 90 | UP |
| 4 (135–180) | 1 | 0 | 1 | A | 180 | DOWN |
| 5 (180–225) | 0 | 0 | 1 | A | 180 | UP |
| 6 (225–270) | 0 | 0 | 0 | B | 270 | DOWN |
| 7 (270–315) | 0 | 1 | 0 | B | 270 | UP |
| 8 (315–360) | 0 | 1 | 1 | A | 360 | DOWN |

Each of the above equations includes a scale factor of 0.872665 which is subsequently used in converting $\theta$ from radians to degrees. The above equations also include a 0.1° zero offset bias which is taken out digitally later.

Figure 3B:
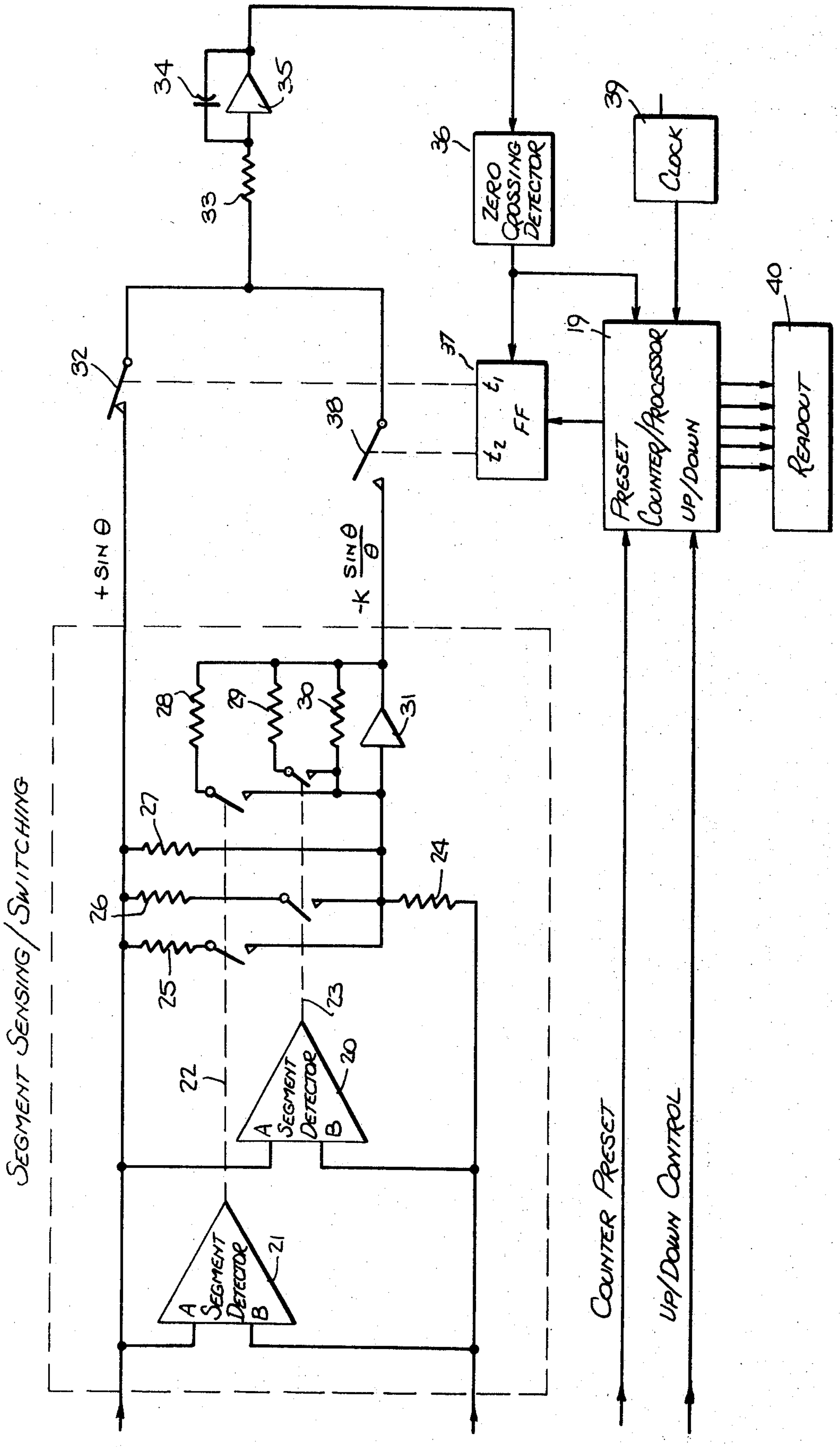
FIG. 3 is a schematic diagram illustrating one manner in which the phase angle $\theta$ may be measured and digitized.

Referring now to FIG. 3B, segment detectors 20 and 21 comprise operational amplifiers which switch respectively at 23.3° and 35.2°. At 23.3° $\sin\theta = 0.3956$, $\cos\theta = 0.9185$ and $\tan\theta = 0.4307$. Thus, at 23.3° the signal at input A of segment detector 20 is 0.3956 volts, while the signal at input B is 0.9185 volts. In order to have segment detector 20 switch at 23.3°, the $\cos\theta$ signal is attenuated by a factor of 0.4307, i.e., tan 23.3°.

At 35.2° $\sin\theta = 0.5764$, $\cos\theta = 0.8171$ and $\tan\theta = 0.7054$. Thus, at 35.2° the signal at input A of segment detector 21 is 0.5764 volts while the signal at input B is 0.8171 volts. In order to have segment detector 21 switch at 35.2°, the $\cos\theta$ signal is attenuated by the factor 0.7054, i.e., tan 35.2°. Although not shown in FIG. 4, both segment detectors 20 and 21 contain a slight hysterisis to prevent chatter at the threshold switching levels.

During the segment 0° – 23.3° both switches 22 and 23 are open. During the segment 23.3° – 35.2° switch 22 is open and switch 23 is closed. During the segment 35.2° – 45° both switches 22 and 23 are closed. The switching for each of the 24 segments is set forth in TABLE 2, infra.

During the segment 0° – 23.3° the function Ksin$\theta/\theta$ is generated by resistors 24, 27 and 30 in conjunction with operational amplifier 31. During the segment 23.3° – 35.2°

TABLE 2

| SEGMENT | SEGMENT SWITCHING SWITCH 18 | SWITCH 22 | SWITCH 23 |
|---|---|---|---|
| 1 (0-23.3) | A | O | O |
| 2 (23.3-35.2) | A | O | C |
| 3 (35.2-45) | A | C | C |
| 4 (45 - 54.8) | B | C | C |
| 5 (54.8-66.7) | B | O | C |
| 6 (66.7 - 90) | B | O | O |
| 7 (90 - 113.3) | B | O | O |
| 8 (113.3-125.2) | B | O | C |
| 9 (125.2 - 135) | B | C | C |
| 10 (135-144.8) | A | C | C |
| 11 (144.8-156.7) | A | O | C |
| 12 (156.7-180) | A | O | O |
| 13 (180-203.3) | A | O | O |
| 14 (203.3-215.2) | A | O | C |
| 15 (215.2-225) | A | C | C |
| 16 (225-234.8) | B | C | C |
| 17 (234.8-246.7) | B | O | C |
| 18 (246.7-270) | B | O | O |
| 19 (270-293.3) | B | O | O |
| 20 (293.3-305.2) | B | O | C |
| 21 (305.2-315) | B | C | C |
| 22 (315-324.8) | A | C | C |
| 23 (324.8-336.7) | A | O | C |
| 24 (336.7 - 360) | A | O | O |

resistors 26 and 29 are added to the circuit by switch 23. Finally, during the segment 35.2°–45° resistors 25 and 28 are also added to the circuit by switch 22. Both relative and typical values for resistors 24 through 30 are set forth in TABLE 3, infra.

Sin$\theta$ and –Ksin$\theta/\theta$ are now processed to yield the desired information, i.e., $\theta$. Clock 39 supplies clock pulses to counter/processor 19 which is preset by decoder logic 15 in accordance with the particular octant in which $\theta$ resides. Counter/processor 19 controls FF 37 which in turn controls switches 32 and 38. Switch 32 is closed by FF 37 during the time $t_1$ which corresponds, for example, to 10,000 clock pulses. During the period $t_1$, sin$\theta$ is applied by switch 32 to the integrator comprising resistor 33, capacitor 34 and operational amplifier 35. At the end of $t_1$ counter/processor 19 causes FF 37 to change state, thereby opening switch 32 and closing switch 38.

During the time period $t_2$, –Ksin$\theta/\theta$ is integrated until the output of the integrator returns to its original state, at which point zero crossing detector 36 supplies a reset signal to FF 37 and counter/processor 19. Integrating sin$\theta$ and –Ksin$\theta/\theta$ in the manner just described establishes the following equations:

$$\int_0^{t_1} \sin\theta dt = K\int_0^{t_2} \frac{\sin\theta}{\theta} dt;$$

$$\sin\theta t_1 = K\frac{\sin\theta}{\theta} t_2;$$

and $$\theta = K\frac{t_2}{t_1}.$$

TABLE 3

| RESISTOR | RESISTOR VALUES RELATIVE VALUE | TYPICAL VALUE |
|---|---|---|
| 24 | 1.0000000 | 15,000.00 |

TABLE 3-Continued

| RESISTOR | RESISTOR VALUES RELATIVE VALUE | TYPICAL VALUE |
|---|---|---|
| 25 | 7.0019479 | 105,029.22 |
| 26 | 6.166068 | 92,491.02 |
| 27 | 5.1208311 | 76,812.47 |
| 28 | 9.9463326 | 149,194.99 |
| 29 | 13.104085 | 196,561.28 |
| 30 | 0.8528916 | 12,793.37 |

Thus, the count registered by counter/processor 19 during time $t_2$ is directly proportional to the desired angle $\theta$ and is a digital representation thereof.

If, for example, $\theta$ is 10° then counter/processor 19 will have been preset to 0° and, during the period $t_2$, will count up to 10.0°. The contents of counter/processor 19 will then be displayed digitally by readout 40. In order to convert $\theta$ from radians to degrees, two scale factors are employed. The manner in which this is accomplished may be easily understood by means of the following example.

If $\theta = 45° = 0.7854$ radians, then sin$\theta = 0.7071$ volts and sin$\theta/\theta = 0.90031$ volts. Substituting these values in the above identity yields:

$t_2 = 0.7071/0.90031\ (10,000) = 7,854$ pulses. The desired number of pulses, however, is 450 to produce a reading of 45.0°, full scale being 360.0°. To convert the 7,854 pulses to 450 pulses it is necessary to divide by a factor of 17.4533. To accomplish this, during the time period $t_2$ the output of clock 39 is divided by a factor of 20, which results in a count of 392.7 pulses for $\theta = 45.0°$. To convert this number to 450 requires division by a factor of 0.872665. But this is precisely the scale factor previously introduced in connection with the piecewise approximations for synthesizing sin$\theta/\theta$. In this manner, the phase angle $\theta$ in degrees is ascertained and displayed digitally by readout 40.

In accordance with the present invention it is also possible to integrate the signal proportional to sin$\theta/\theta$ for a time $t_1$ after which the signal sin$\theta$ is integrated in the opposite direction for a time $t_2$ until the integrator output returns to its original state. This results in the following equations:

$$K\int_0^{t_1} \frac{\sin\theta}{\theta} dt = \int_0^{t_2} \sin\theta dt$$

$$K\frac{\sin\theta}{\theta} t_1 = \sin\theta t_2;$$

and $$\theta = \frac{Kt_1}{t_2}$$

Thus, the desired angle $\theta$ is inversely proportional to the count registered by counter/processor 19 during the period $t_2$. A simple manipulation by counter/processor 19 is all that is required to convert $\theta$ to a form suitable for display by readout 40.

One could also practice the present invention by synthesizing a signal proportional to cos$\theta/\theta$ from the signals proportional to sin$\theta$ and cos$\theta$. Integrating signals proportional to cos$\theta$ and cos$\theta/\theta$ in the manner previously described results in the following equations:

$$\int_o^{t_1} \cos\theta dt = K\int_o^{t_2} \frac{\cos\theta}{\theta} dt;$$

$$\cos\theta t_1 = \frac{K\cos\theta}{\theta} t_2;$$

and $$\theta = \frac{Kt_2}{t_1}$$

The result is identical. This follows from the fact that $\cos\theta = \sin(90°-\theta)$. For purposes of this embodiment of the invention, therefore, using signals proportional to $\cos\theta$ and $\cos\theta/\theta$ is the same as using signals proportional to $\sin\theta$ and $\sin\theta/\theta$. The results obtained in each case are identical.

In the practice of this invention it is also possible to utilize a signal proportional to the combination of $\sin\theta$ and $\sin\theta/\theta$ and a signal proportional to either $\sin\theta$ or $\sin\theta/\theta$. For example, integrating a signal proportional to $\sin\theta$ for a time $t_1$ and integrating a signal proportional to $\sin\theta + \sin\theta/\theta$ in the opposite direction for a time $t_2$ until the integrator output returns to its original state yields the following equation:

$$\int_o^{t_1} \sin\theta dt = \int_o^{t_2} \left(\sin\theta + \frac{\sin\theta}{\theta}\right) dt;$$

$$\sin\theta t_1 = \sin\theta t_2 + \frac{\sin\theta}{\theta} t_2;$$

and $$\theta = \frac{t_2}{t_1 - t_2}.$$

Thus, $\theta$ is once again given in terms of $t_1$ and $t_2$. Simple manipulation by counter/processor 19 will place $\theta$ in a form suitable for display by readout 40. For example, an up/down counter may be employed to count up during $t_1$ and count down during $t_2$ to calculate $t_1 - t_2$. A second counter could then be employed to count up during $t_2$. The ratio of these counter readings yields $\theta$.

Figures 4A, 4B:
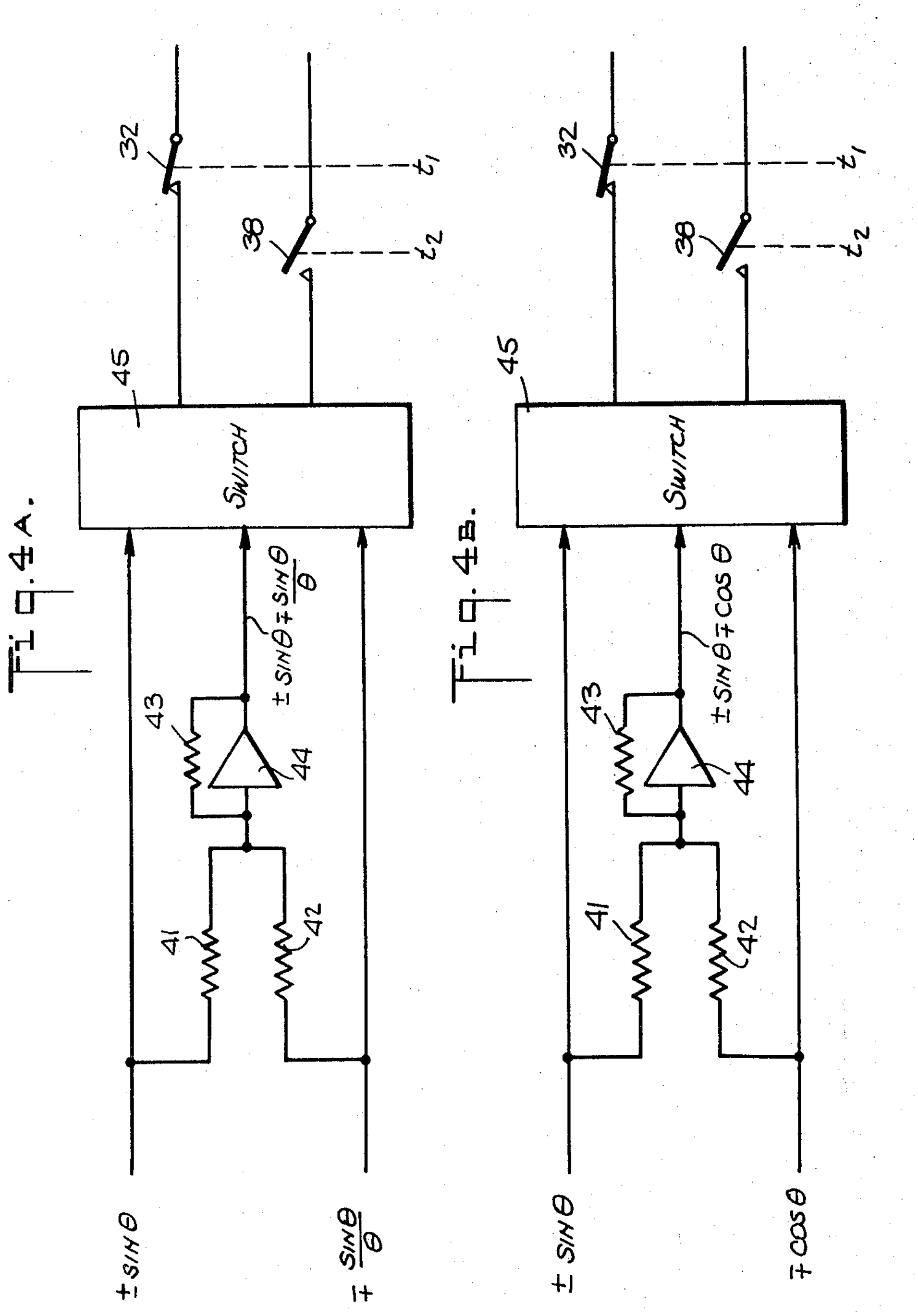
FIG. 4 is a schematic diagram illustrating one manner in which voltages may be combined prior to integration.

FIG. 4A illustrates one way in which the signals proportional to $\sin\theta$ and $\sin\theta/\theta$ may be combined. The signal proportional to $\sin\theta$ is supplied to switch 45 and to one input of the summing amplifier formed by resistors 41, 42 and 43 and operational amplifier 44. The signal proportional to $\sin\theta/\theta$ is also fed to switch 45 and to the second input of the summing amplifier. The summing amplifier produces as an output a signal proportional to the combination of $\sin\theta$ and $\sin\theta/\theta$. This output signal is also fed to switch 45. During the time $t_1$ switch 45 selects one of the three input signals and applies it to switch 32 which is connected to the integrator during that time. During time $t_2$ switch 45 selects a different input signal and applies it to switch 38 which is connected to the integrator during that time.

In another embodiment of the invention it is not necessary to synthesize functions proportional to $\sin\theta/\theta$ or $\cos\theta/\theta$. Rather a signal proportional to $\sin\theta$ is integrated during the time $t_1$ and a signal proportional to $\cos\theta$ is integrated in the opposite direction during the time $t_2$ which is required for the integrator to return to its original state. This establishes the following equations:

$$\int_o^{t_1} \sin\theta dt = \int_o^{t_2} \cos\theta dt;$$

$$\sin\theta t_1 = \cos\theta t_2;$$

and $$\tan\theta = t_2/t_1.$$

Thus, the count accumulated in counter/processor 19 during the time $t_2$ is directly proportional to a function of $\theta$. The inverse of that function is obtained by counter/processor 19, for example, by means of a look-up table or a read only memory.

Reversing the order of integration yields the following equations:

$$\int_o^{t_1} \cos\theta dt = \int_o^{t_2} \sin\theta dt;$$

$$\cos\theta t_1 = \sin\theta t_2;$$

$$\cot\theta = t_2/t_1.$$

Once again, the count in counter/processor accumulated during $t_2$ is directly proportional to a function of $\theta$. Taking the inverse of that function yields the angle $\theta$ which may be displayed by readout 40.

As with the signals proportional to $\sin\theta$ and $\sin\theta/\theta$, it is also possible to use signals proportional to the combination of $\sin\theta$ and $\cos\theta$. To illustrate:

$$\int_o^{t_1} \sin\theta dt = \int_o^{t_2} (\sin\theta + \cos\theta) dt;$$

$$\sin\theta t_1 = \sin\theta t_2 + \cos\theta t_2;$$

$$\sin\theta(t_1 - t_2) = \cos\theta t_2;$$

and $$\tan\theta = \frac{t_2}{t_1 - t_2}$$

The function of $\theta$ is once again given in terms of $t_1$ and $t_2$. A simple manipulation by counter/processor 19 will permit the inverse function to be obtained and displayed.

FIG. 4B shows one way in which the signals proportional to $\sin\theta$ and $\cos\theta$ may be combined. Each of the circuit elements in FIG. 4B bears the same numerical designation and performs the same way as described in connection with FIG. 4A.

Figure 5:
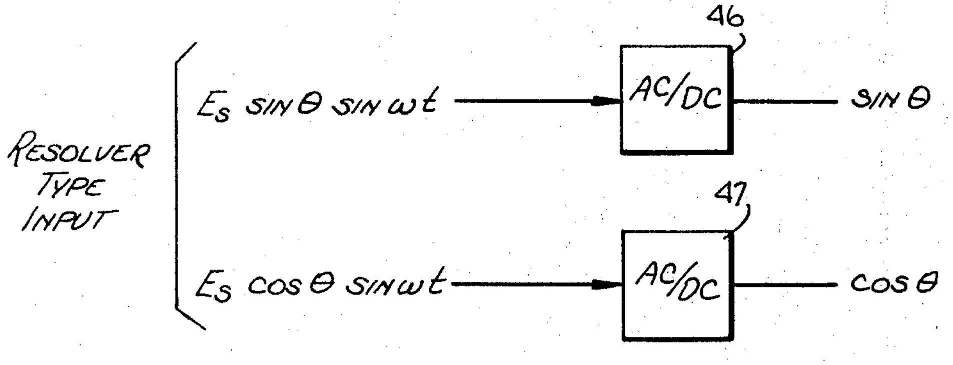
FIG. 5 is a schematic diagram illustrating the conversion of resolver-type signals from AC to DC.
Figure 8A:
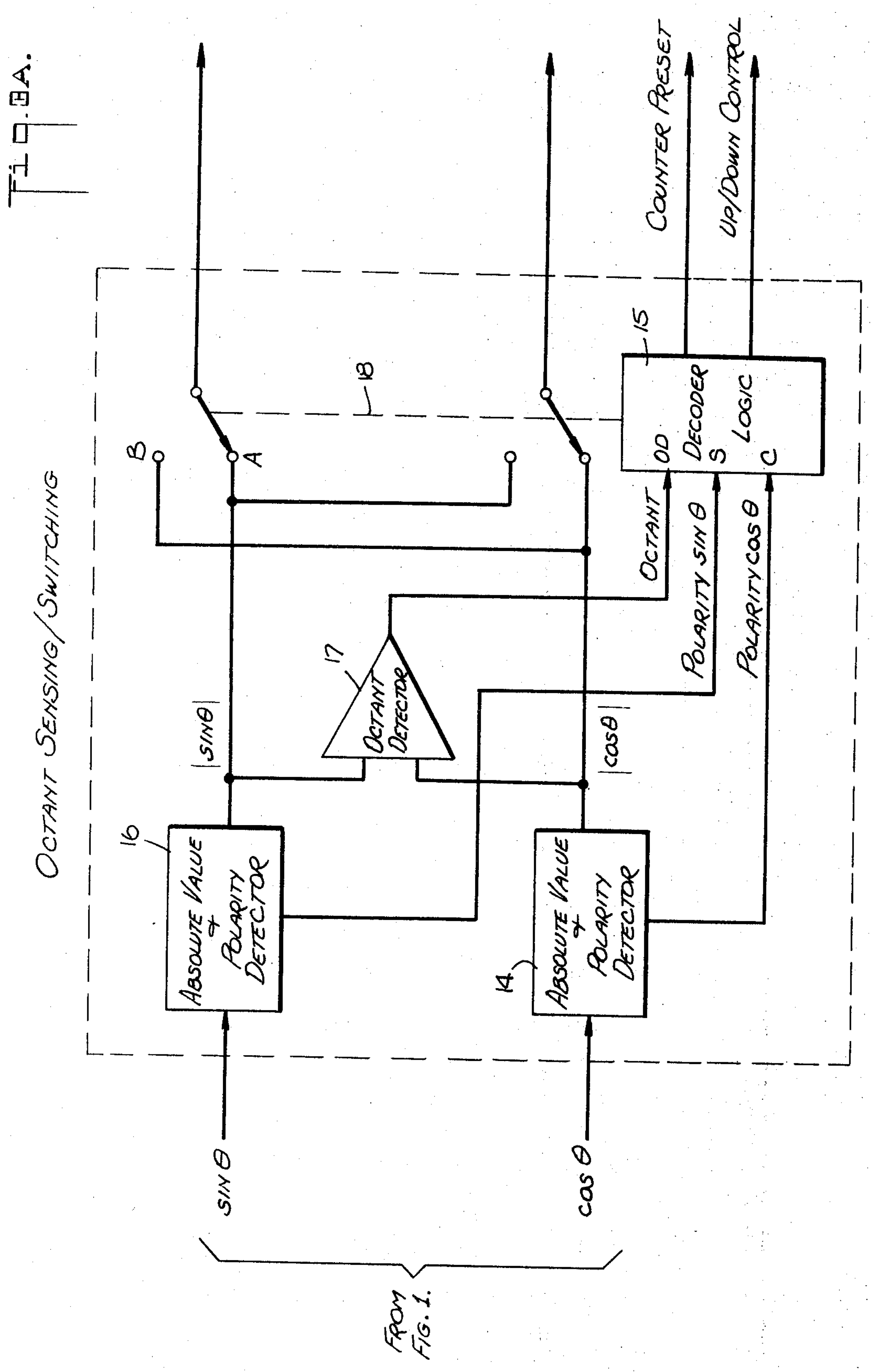

As noted previously, resolver-type signals also carry phase information. These signals are of the form $E_s\sin\theta$ sinwt and $E_s\cos\theta$ sinwt. The phase information may be separated from the AC carrier by any one of a number of known methods for AC/DC conversion. Rectification is but one example. AC/DC conversion yields DC signals proportional to $\sin\theta$ and $\cos\theta$. This conversion process is illustrated in FIG. 5. The DC signals proportional to $\sin\theta$ and $\cos\theta$ may now be manipulated in any one of the number of ways disclosed earlier to derive and display the phase information.

The invention disclosed and claimed herein is not limited to the specific mechanisms and techniques herein shown and described since modifications will undoubtedly occur to those skilled in the art. Hence, departures may be made from the form of the instant invention without departing from the principles thereof.

What is claimed is:

1. Signal processing apparatus for deriving a digital representation of $\theta$ from signals proportional to $\sin\theta$ and $\cos\theta$ including:

a. synthesizing means responsive to said signals proportional to $\sin\theta$ and $\cos\theta$ for deriving therefrom a signal proportional to $\sin\theta/\theta$;

b. integrating means operably connected to said synthesizing means and responsive to said signals proportional to $\sin\theta$ and $\sin\theta/\theta$ for integrating one of said signals in one direction for a time $t_1$ and the other of said signals in the opposite direction for a time $t_2$ until the output of said integrating means returns to its original state; and c. counting/processing means operably connected to said integrating means and responsive thereto for deriving therefrom a digital representation of $\theta$.

2. Apparatus according to claim 1 wherein said signals proportional to sin$\theta$ and cos$\theta$ are derived from resolver-type signals proportional to sin$\theta$ sinwt and cos$\theta$ sinwt.

3. Signal processing apparatus for deriving a digital representation of $\theta$ from signals proportional to sin$\theta$ and cos$\theta$ including:

a. synthesizing means responsive to said signals proportional to sin$\theta$ and cos$\theta$ for deriving therefrom an output signal proportional to sin$\theta/\theta$;

b. summing means operably connected to said synthesizing means and responsive to said signals proportional to sin$\theta$ and sin$\theta/\theta$ for developing therefrom a composite signal proportional to sin$\theta$ and sin$\theta/\theta$;

c. switching means operably connected to said synthesizing means and responsive to said signals proportional to sin$\theta$ and sin$\theta/\theta$ for selecting one of said signals;

d. integrating means operably connected to said summing means and said switching means and responsive to said selected signal and said composite signal for integrating one of said signals in one direction for a time $t_1$ and the other of said signals in the opposite direction for a time $t_2$ until the output of said integrating means returns to its original state; and e. counting/processing means operably connected to said integrating means and responsive thereto for deriving therefrom a digital representation of $\theta$.

4. Signal processing apparatus for deriving a digital representation of $\theta$ from a signal proportional to sin(wt + $\theta$) and a reference signal including:

a. synthesizing means responsive to said signal proportional to sin(wt + $\theta$) and said reference signal for deriving therefrom signals proportional to sin$\theta$ and sin$\theta/\theta$;

b. integrating means operably connected to said synthesizing means and responsive to said signals proportional to sin$\theta$ and sin$\theta/\theta$ for integrating one of said signals in one direction for a time $t_1$ and the other of said signals in the opposite direction for a time $t_2$ until the output of said integrating means returns to its original state; and c. counting/processing means operably connected to said integrating means and responsive thereto for deriving therefrom a digital representation of $\theta$.

5. Apparatus according to claim 4 further including display means operably connected to said counting/processing means and responsive thereto for digitally displaying $\theta$ in degrees.

6. Apparatus according to claim 4 wherein said synthesizing means includes means for deriving from said signal proportional to sin(wt+$\theta$) signals proportional to sin$\theta$ and cos$\theta$ and means for synthesizing therefrom said signal proportional to sin$\theta/\theta$.

7. Apparatus according to claim 6 wherein said means for synthesizing said signal proportional to sin$\theta/\theta$ includes piecewise approximation means.

8. Apparatus according to claim 4 wherein said synthesizing means includes means for incorporating a scale factor into at least one of said signals proportional to sin$\theta$ and sin$\theta/\theta$ for facilitating the conversion of $\theta$ from radians to degrees.

9. Signal processing apparatus for deriving a digital representation of a $\theta$ from a signal proportional to sin(wt+$\theta$) and a reference signal including:

a. synthesizing means responsive to said signal proportional to sin(wt+$\theta$) and said reference signal for deriving therefrom signals proportional to sin$\theta$ and sin$\theta/\theta$;

b. integrating means operably connected to said synthesizing means and responsive thereto for integrating said signal proportional to sin$\theta$ in one direction for a time $t_1$ and said signal proportional to sin$\theta/\theta$ in the opposite direction for a time $t_2$ until said integrating means returns to its original state; and c. counting means operably connected to said integrating means and responsive thereto for counting during said time period $t_2$ to generate a digital representation directly proportional to $\theta$.

10. Apparatus according to claim 9 wherein said synthesizing means includes means for incorporating a scale factor into at least one of said signals proportional to sin$\theta$ and sin$\theta/\theta$ for facilitating the conversion of $\theta$ from radians to degrees.

11. Apparatus according to claim 9 wherein said synthesizing means includes means for deriving said signal proportional to sin$\theta/\theta$ over an octant and further includes switching means for utilizing said signal proportional to sin$\theta/\theta$ over all eight octants.

12. Apparatus according to claim 11 wherein said synthesizing means includes segment sensing and switching means for deriving a piecewise approximation of said signal proportional to sin$\theta/\theta$ over an octant.

13. Apparatus according to claim 12 wherein said segment sensing and switching means effects said piecewise approximations of said signal proportional to sin$\theta/\theta$ over three segments comprising an octant and wherein said segments comprise on the order of 23°, 12° and 10°.

14. Apparatus according to claim 11 wherein said switching means includes octant sensing and switching means for presetting said counting means and for controlling the direction of counting of said counting means.

15. Apparatus according to claim 9 wherein said synthesizing means includes phase-locked loop means responsive to said reference signal for generating a plurality of chopping waveforms and demodulator means operably connected to said phase locked loop means and responsive thereto and to said signal proportional to sin(wt+$\theta$) for deriving therefrom signals proportional to sin$\theta$ and cos$\theta$ for use in deriving said signals proportional to sin$\theta$ and sin$\theta/\theta$.

16. Apparatus according to claim 15 wherein said chopping waveforms are $\pi/6$ chopping waveforms.

17. Signal processing apparatus for deriving a digital representation of $\theta$ from a signal proportional to sin(wt+$\theta$) and a reference signal including:

a. circuit means responsive to said signal proportional to sin(wt+$\theta$) and said reference signal for deriving therefrom signals proportional to sin$\theta$ and cos$\theta$;

b. synthesizing means operably connected to said circuit means and responsive thereto for deriving therefrom an output signal proportional to $\sin\theta/\theta$;

c. summing means operably connected to said circuit means and said synthesizing means and responsive thereto for developing a composite signal proportional to $\sin\theta$ and $\sin\theta/\theta$;

d. switching means operably connected to said circuit means and said synthesizing meand and adapted for selecting one of said signals proportional to $\sin\theta$ and $\sin\theta/\theta$;

e. integrating means operably connected to said switching means and said summing means and responsive to said selected signal and said composite signal for integrating one of said signals in one direction for a time $t_1$ and the other of said signals in the opposite direction for a time $t_2$ until the output of said integrating means returns to its original state; and f. counting/processing means operably connected to said integrating means and responsive thereto for deriving therefrom a digital representation of $\theta$.

18. Apparatus according to claim 17 wherein said synthesizing means includes means for incorporating a scale factor into said signal proportional to $\sin\theta/\theta$ for facilitating conversion of $\theta$ from radians to degrees.

* * * * *

UNITED STATES PATENT OFFICE
CERTIFICATE OF CORRECTION

Patent No. 3,839,716 Dated October 1, 1974

Inventor(s) George Reichnebacher

It is certified that error appears in the above-identified patent and that said Letters Patent are hereby corrected as shown below:

On the Title page, in item 75 "Reichnebacher" should read -- Reichenbacher --.

Signed and sealed this 17th day of December 1974.

(SEAL)
Attest:

McCOY M. GIBSON JR.
Attesting Officer

C. MARSHALL DANN
Commissioner of Patents